Patented Sept. 7, 1943

2,328,963

UNITED STATES PATENT OFFICE 2,328,963

REACTION PRODUCT OF ALDEHYDES AND TRIAZINE DERIVATIVES

Gaetano F. D'Alelio and James W. Underwood, Pittsfield, Mass., assignors to General Electric Company, a corporation of New York No Drawing. Application September 17, 1942, Serial No. 458,725

20 Claims. (Cl. 260—42)

This invention relates to the production of new synthetic materials and especially to new reaction products having particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, dimethylol urea, trimethylol melamine, aldol, glycollic aldehyde, etc., and an ester of a bis-(triazinyl thio) monocarboxylic aliphatic acid corresponding to the following general formula:

I
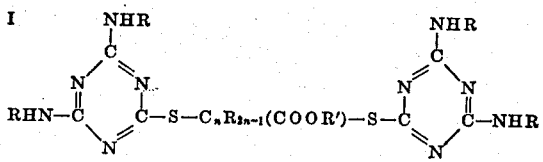

In the above formula $n$ represents an integer and is at least 1 and not more than 2, R represents a member of the class consisting of hydrogen and monovalent hydrocarbon and substituted hydrocarbon radicals, more particularly halo-hydrocarbon radicals, and R' represents a member of the class consisting of monovalent aliphatic hydrocarbon radicals and monovalent aromatic and nuclearly substituted, specifically nuclearly halogenated, aromatic hydrocarbon radicals.

This application is a continuation-in-part of our copending application Serial No. 456,264, filed August 26, 1942, and assigned to the same assignee as the present invention.

Instead of the symmetrical triazine (s-triazine) derivatives represented by the above formula, corresponding derivatives of the asymmetrical triazines or of the vicinal triazines may be employed.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc.

Illustrative examples of monovalent aliphatic and aromatic hydrocarbon radicals that R' in the above formula may represent are radicals such as above mentioned with reference to R. Illustrative examples of monovalent, nuclearly substituted, specifically nuclearly halogenated, aromatic hydrocarbon radicals that R' also may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like.

Preferably R in Formula I represents hydrogen, in which case the compounds correspond to the general formula II
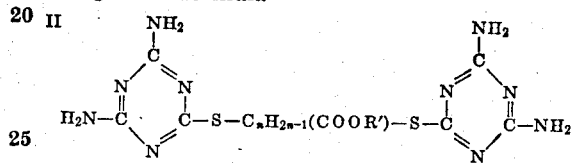

where $n$ and R' have the same meanings as given above with reference to Formula I. However, there also may be used in carrying the present invention into effect compounds such, for instance, as those represented by the general formula III
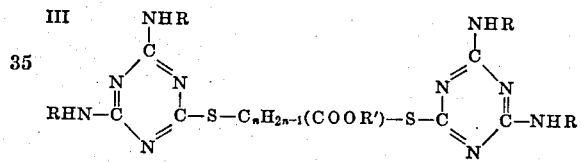

where $n$, R and R' have the same meanings as given above with reference to Formula I.

The triazine derivatives that are used in carrying the present invention into effect are more fully described and are specifically claimed in our parent copending application Serial No. 456,264. As pointed out in this copending application, the triazine derivatives employed in practicing the instant invention are prepared by effecting reaction, in the presence of a hydrohalide acceptor, e. g., an alkali-metal hydroxide, between (1) a mercapto diamino [(—NHR)₂] s-triazine and (2) an ester of a dihalogenated aliphatic monocarboxylic acid corresponding to the general formula

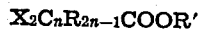

where X represents a halogen atom and $n$, R and R' have the same meanings as given above with reference to Formula I, the reactants being employed in the ratio of at least two mols of the mercapto diamino s-triazine of (1) per mol of the ester of (2).

Examples of compounds embraced by Formula I that may be used in producing our new condensation products are listed below:

Methyl alpha,beta-bis-(diamino s-triazinyl thio) propionate
Ethyl bis-(diamino s-triazinyl thio) acetate
Propyl alpha,beta-bis-(diamino s-triazinyl thio) butyrate
Methyl alpha,beta-bis-[di-(methylamino) s-triazinyl thio] propionate
Phenyl bis-(diamino s-triazinyl thio) acetate
Methyl bis-(diamino s-triazinyl thio) acetate, which also may be named methyl bis-(2,4-diamino s-triazinyl-6 thio) acetate, methyl bis-(2,6-diamino s-triazinyl-4 thio) acetate or methyl bis-(4,6-diamino s-triazinyl-2 thio) acetate
Crotyl bis-(diamino s-triazinyl thio) acetate
Octyl alpha,beta-bis-(diamino s-triazinyl thio) propionate
Hexyl alpha,beta-bis-(diamino s-triazinyl thio) propionate
Methyl alpha,beta-bis-(diamino s-triazinyl thio) valerate
Isopropyl alpha,beta-bis-(diamino s-triazinyl thio) propionate
Methyl alpha-methyl alpha,beta-bis-(diamino s-triazinyl thio) butyrate
Isobutyl bis-(diamino s-triazinyl thio) acetate
Propenyl bis-(diamino s-triazinyl thio) acetate
Phenyl bis-[di-(methylamino) s-triazinyl thio] acetate
Tolyl bis-(diamino s-triazinyl thio) acetate
Ethyl alpha,beta-bis-(diamino s-triazinyl thio) propionate
Phenyl alpha,beta-bis-(diamino s-triazinyl thio) propionate
Methyl bis-[di-(methylamino) s-triazinyl thio] acetate
Ethyl bis-[di-(ethylamino) s-triazinyl thio] acetate
Phenyl bis-[di-(isobutylamino) s-triazinyl thio] acetate
Fluorophenyl bis-[di-cyclopentylamino) s-triazinyl thio] acetate
Tolyl bis-[di-(propenylamino) s-triazinyl thio] acetate
Methyl alpha,beta-bis-(dianilino s-triazinyl thio) propionate
Ethyl alpha-ethyl alpha,beta-bis-(ditoluido s-triazinyl thio) propionate
Phenyl alpha-phenyl beta,beta-bis-(diamino s-triazinyl thio) propionate
Propyl alpha-(chlorophenyl) beta,beta-bis-(diamino s-triazinyl thio) propionate
Xenyl alpha-ethyl beta,beta-bis-(diamino s-triazinyl thio) propionate
Pentyl beta-methyl alpha,beta-bis-(diamino s-triazinyl thio) propionate
Tolyl beta-propyl alpha,beta-bis-(diamino s-triazinyl thio) propionate
Methyl alpha,beta-bis-(4-methylamino 6-amino s-triazinyl-2 thio) propionate
Ethyl alpha,alpha-bis-(4-anilino 6-amino s-triazinyl-2 thio) propionate
Chlorophenyl bis-(diamino s-triazinyl thio) acetate
Chloronaphthyl bis-(diamino s-triazinyl thio) acetate
Methyl bis-(ditoluido s-triazinyl thio) acetate
Methyl bis-[di-(iodoanilino) s-triazinyl thio] acetate
Methyl bis-[di-(chloroethylamino) s-triazinyl thio] acetate
Propyl bis-(diamino s-triazinyl thio) acetate
Xylyl bis-(diamino s-triazinyl thio) acetate
Xenyl bis-(diamino s-triazinyl thio) acetate
Naphthyl bis-(diamino s-triazinyl thio) acetate
Allyl bis-(diamino s-triazinyl thio) acetate
Bromophenyl bis-(diamino s-triazinyl thio) acetate
Hexyl alpha,beta-bis-[di-(allylamino) s-triazinyl thio] propionate
Cyclohexyl alpha,beta-bis-[di-(cyclohexylamino) s-triazinyl thio] propionate
Methyl bis-[di-(cyclohexenylamino) s-triazinyl thio] acetate
Benzyl bis-(diamino s-triazinyl thio) acetate
Phenethyl bis-(diamino s-triazinyl thio) acetate
Ethylphenyl bis-(diamino s-triazinyl thio) acetate
Tolyl alpha,beta-bis-(dianilino s-triazinyl thio) propionate
Methyl bis-(4-naphthylamino 6-ethylamino s-triazinyl-2 thio) acetate
Phenyl alpha,beta-bis-[di-(naphthylamino) s-triazinyl thio] propionate
Iodophenyl bis-(diamino s-triazinyl thio) acetate
Allyl alpha,beta-bis-(diamino s-triazinyl thio) propionate
Methallyl bis-(diamino s-triazinyl thio) acetate
Tetradecyl bis-(diamino s-triazinyl thio) acetate
Octyl bis-(diamino s-triazinyl thio) acetate
Hexyl alpha,alpha-bis-(diamino s-triazinyl thio) propionate
Heptyl beta,beta-bis-(diamino s-triazinyl thio) propionate It will be noted that the above list includes examples of aliphatic (e. g., alkyl, alkenyl), aromatic and nuclearly halogenated aromatic esters of bis-(triazinyl thio) acetic and propionic acids.

The present invention is based on our discovery that new and valuable materials having particular utility in the plastics and coating arts can be produced by effecting reaction between ingredients comprising essentially an aldehyde, including polymeric aldehydes, hydroxyaldehydes and aldehyde-addition products, and a triazine derivative, more particularly an ester of a bis-(triazinyl thio) monocarboxylic aliphatic acid, of the kind embraced by Formula I, numerous examples of which have been given above and in our copending application Serial No. 456,264. Due to the numerous reactive positions in the triazine derivatives employed in practicing our invention, cured resinous aldehyde-reaction products prepared therefrom are outstanding in their resistance to water and organic solvents. The gloss and general appearance of molded articles made from molding compounds containing these new resins in heat-convertible state also are exceptionally good. Other improved properties, including improved plasticity combined with rapid-curing characteristics and, also, high resistance to heat and abrasion in the cured state, make the products of the present invention suitable for use in fields of utility, for instance in electrically insulating applications, for which resinous materials of lesser resistance to heat, water, abrasion and organic solvents would be wholly unsuited.

It has been known heretofore that resinous materials can be prepared by effecting reaction between an aldehyde and certain aminotriazines, e. g., melamine, ammeline and certain thioammeline ethers. While such resins are suitable for numerous industrial applications, they are not entirely satisfactory for some uses where optimum heat-, water- and abrasion-resistance are required. Furthermore, in some cases their curing characteristics and plastic flow during molding are inadequate for the high-speed molding technique required for economical and efficient molding operations. These and other production difficulties and deficiencies in useful properties are obviated by creating a synthetic composition from an aldehyde and a triazine derivative of the kind embraced by Formula I.

In practicing our invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases, it is often desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the triazine derivative may be carried out in the presence or absence of solvents or diluents, other natural or synthetic resinous bodies, or while admixed with other materials that also can react with the aldehydic reactant or with the triazine derivative, e. g., urea ($NH_2CONH_2$), thiourea, selenourea, iminourea (guanidine) and substituted ureas, thioureas, selenoureas and iminoureas, e. g., aldehyde-reactable urea derivatives such as mentioned in D'Alelio Patent No. 2,285,418, issued June 9, 1942, page 1, column 1, lines 40-49; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aminodiazines; aldehyde-reactable triazines other than the triazine derivatives constituting the primary components of the resins of the present invention, e. g., melamine, ammeline, ammelide, melem, melam, melon, numerous other examples being given in various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned in D'Alelio Patent No. 2,239,441, issued April 22, 1941; monohydric and polyhydric alcohols, e. g., butyl alcohol, amyl alcohol, heptyl alcohol, octyl alcohol, 2-ethylbutyl alcohol, ethylene glycol, propylene glycol, glycerine, polyvinyl alcohol, etc.; amines, including aromatic amines, e. g., aniline, etc.; and the like.

The modifying reactants may be incorporated with the triazine derivative and the aldehyde to form an intercondensation product by mixing all the reactants and effecting condensation therebetween or by various permutations of reactants as described, for example, in D'Alelio Patent No. 2,281,559, issued May 5, 1942 (page 2, column 1, lines 46-69), with particular reference to reactions involving a non-halogenated-acylated urea, a halogenated acylated urea and an aliphatic aldehyde. For instance, we may form a partial condensation product of ingredients comprising (1) urea or melamine or urea and melamine, (2) a triazine derivative of the kind embraced by Formula I, for example an aliphatic ester, more particularly an alkyl ester, of bis-(diamino s-triazinyl thio) acetic or propionic acids, e. g., ethyl bis-(diamino s-triazinyl thio) acetate, methyl alpha,beta-bis-(diamino s-triazinyl thio) propionate, etc., an aromatic ester of bis-(diamino s-triazinyl thio) acetic or propionic acids, e. g., phenyl bis-(diamino s-triazinyl thio) acetate, tolyl alpha,beta-bis-(diamino s-triazinyl thio) propionate, etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, e. g., hexamethylol melamine, etc. Thereafter we may effect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

Example 1

|  | Parts |
|---|---|
| Methyl alpha,beta-bis-(diamino s-triazinyl thio) propionate | 27.8 |
| Aqueous formaldehyde (approx. 37.1% HCHO) | 30.5 |
| Aqueous ammonia (approx. 28% NH$_3$) | 2.8 |
| Sodium hydroxide in 1.5 parts water | 0.03 |
| Chloroacetamide (monochloroacetamide) | 0.3 |

All of the above ingredients with the exception of the chloroacetamide were heated together under reflux at the boiling temperature of the mass for 10 minutes. The chloroacetamide was now added and heating under reflux was continued just long enough to effect complete solution of the chloroacetamide, which intercondensed with the partial condensation product of the triazine derivative and formaldehyde. The resulting resinous syrup had a pH of 6.67. This syrup was mixed with 20.5 parts alpha cellulose in flock form and 0.2 part of a mold lubricant, specifically zinc stearate, to form a molding (moldable) compound. The wet molding composition was dried at room temperature until sufficient moisture had been removed to provide a material that could be molded satisfactorily. A well-cured molded piece having excellent cohesive characteristics was obtained by molding a sample of the dried and ground molding compound for a few minutes at 135° C. under a pressure of 2,000 pounds per square inch. The molded article had a smooth, glossy surface appearance and very good resistance to water. The plasticity of the molding compound during molding also was very good as evidenced by the amount of flash on the molded piece.

Instead of using chloroacetamide in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha,beta-dibromopropionitrile, ethylene diamine hydrochloride, aminoacetamide hydrochloride, the ethanolamine hydrochlorides, nitrourea, chloroacetyl urea, glycine, chloroacetone, sulfamic acid, citric diamide, phenacyl chloride, etc.). Other examples of curing reactants that may be employed to accelerate or to effect the curing of the thermosetting or potentially thermosetting resins of this and other examples are given in various copending applications of one or both of us, for instance in D'Alelio copending application Serial No. 346,962, filed July 23, 1940, and Serial No. 354,395, filed August 27, 1940, both of which applications are assigned to the same assignee as the present invention.

Example 2

|  | Parts |
|---|---|
| Methyl alpha,beta-bis-(diamino s-triazinyl thio) propionate | 11.1 |
| Urea | 7.2 |
| Aqueous formaldehyde (approx. 37.1% HCHO) | 30.5 |
| Sodium hydroxide in 1.2 parts water | 0.025 |
| Chloroacetamide | 0.6 |

All of the above ingredients with the exception of the chloroacetamide were heated together under reflux at the boiling temperature of the mass for 21 minutes, after which the above-stated amount of chloroacetamide was added and refluxing was continued for an additional 12 minutes. The resulting resinous syrup had a pH of 3.55. This syrup was mixed with 16.4 parts alpha cellulose and 0.2 part zinc stearate to form a molding compound. The wet molding composition was dried as described under Example 1. A well-cured molded piece having a well-knit and homogeneous structure and good water resistance was obtained by molding a sample of the dried and ground molding compound for 3 minutes at 135° C. under a pressure of 2,000 pounds per square inch.

Example 3

|  | Parts |
|---|---|
| Methyl alpha,beta-bis-(diamino s-triazinyl thio) propionate | 27.8 |
| Para-toluene sulfonamide | 12.8 |
| Aqueous formaldehyde (approx. 37.1% HCHO) | 30.5 |
| Sodium hydroxide in 1.7 parts water | 0.035 |
| Chloroacetamide | 0.35 |

All of the above ingredients with the exception of the chloroacetamide were heated together under reflux at boiling temperature for 16 minutes. After adding the above-stated amount of chloroacetamide, the resulting resinous syrup (pH 6.12) immediately was mixed with 23.8 parts alpha cellulose and 0.2 part zinc stearate to form a molding composition. The wet molding compound was dried at 60° C. as described under Example 1. A well-cured, well-knit molded piece was obtained by molding a sample of the dried and ground molding composition for 5 minutes at 135° C. under a pressure of 2,000 pounds per square inch. The molded article was somewhat thermoelastic when hot, showing the beneficial plasticizing effect of the para-toluene sulfonamide upon the resin. The molding compound of this example would be especially valuable in the preparation of molded articles such as screw caps that should be thermoelastic when hot in order that they may be sprung satisfactorily while hot from the mold.

Example 4

|  | Parts |
|---|---|
| Methyl alpha,beta-bis-(diamino s-triazinyl thio) propionate | 27.8 |
| Dimethylol urea (commercial grade containing approx. 11% by weight of water) | 50.5 |
| Aqueous ammonia (approx. 28% NH$_3$) | 2.8 |
| Sodium hydroxide in 2 parts water | 0.04 |
| Water | 100.0 |
| Chloroacetamide | 0.4 |

All of the above ingredients with the exception of the chloroacetamide were heated together under reflux at the boiling temperature of the mass for 19 minutes. The chloroacetamide was now added and heating under reflux was continued for an additional 5 minutes. The resulting syrupy condensation product, which had a pH of 6.07, was mixed with 27.2 parts alpha cellulose and 0.2 part zinc stearate to form a molding composition. The wet molding compound was dried at 60° C. as described under Example 1. A sample of the dried and ground molding compound was molded for several minutes at 135° C. under a pressure of 2,000 pounds per square inch. The molded article was excellently cured throughout and had a well-cohered surface. Good plasticity during molding was evidenced by the amount of flash on the molded piece.

The dimethylol urea in the above formula may be replaced in whole or in part by an equivalent amount of other aldehyde-addition products, e. g., a methylol melamine, more particularly a polymethylol melamine such, for instance, as trimethylol melamine, hexamethylol melamine, etc.

Example 5

| | Parts |
|---|---|
| Methyl alpha,beta-bis-(diamino s-triazinyl thio) propionate | 27.8 |
| Acrolein | 16.8 |
| Sodium hydroxide in 1 part water | 0.02 |
| Water | 100.0 | were heated together under reflux at the boiling temperature of the mass for 4 minutes, at the end of which period of time a resinous mass precipitated from the solution. When a small sample of this resin was heated on a 140° C. hot plate, it cured rapidly to an insoluble and infusible state in the absence of a curing agent. The resinous condensation product of this example is suitable for use in the preparation of molding compositions.

Example 6

| | Parts |
|---|---|
| Methyl alpha,beta-bis-(diamino s-triazinyl thio) propionate | 10.0 |
| Aqueous formaldehyde (approx. 37.1% HCHO) | 50.0 |
| Sodium hydroxide solution (0.52 N) | 0.04 |
| Butyl alcohol | 50.0 |

All of the above ingredients with the exception of the butyl alcohol were heated together under reflux at the boiling temperature of the mass for 5 minutes. The butyl alcohol was now added and heating under reflux was continued for about 10 minutes more. The syrupy condensation product was dehydrated by heating it on a steam plate. The dehydrated syrup was soluble in ethyl alcohol, butyl alcohol, ethylene glycol and Solvatone. A small portion of the dehydrated resinous syrup was dissolved in butyl alcohol to form a liquid coating composition. This coating material was applied to a glass plate. The coated plate was air-dried for a short period and then was baked at 60° C. for several hours. A smooth, transparent, hard water-resistant baked film was formed on the plate. Chloroacetamide, glycine, sulfamic acid or other curing agent such as mentioned under Example 1 may be incorporated into the initial syrupy condensation product or into the dehydrated syrup to yield thermosetting materials that cure rapidly under heat to an insoluble, infusible state. The resinous material of this example, with or without a curing agent, may be used in the preparation of various coating and impregnating compositions. It may be employed as a modifier of varnishes of the aminoplast and alkyd-resin types.

Example 7

| | Parts |
|---|---|
| Methyl alpha,beta-bis-(diamino s-triazinyl thio) propionate | 27.8 |
| Aqueous formaldehyde (approx. 37.1% HCHO) | 48.6 |
| Sodium hydroxide in 2 parts water | 0.04 |
| Acetamide | 4.4 | were heated together under reflux at the boiling temperature of the mass for 15 minutes, yielding a resinous syrup that was potentially heat-curable as shown by the fact that when chloroacetamide, sulfamic acid, nitrourea, glycine or other curing agent such as mentioned under Example 1 was incorporated therein, followed by heating on a 140° C. hot plate, the modified syrup cured to an insoluble, infusible state.

Example 8

| | Parts |
|---|---|
| Methyl alpha,beta-bis-(diamino s-triazinyl thio) propionate | 27.8 |
| Diethyl malonate | 12.0 |
| Aqueous formaldehyde (approx. 37.1% HCHO) | 48.6 |
| Sodium hydroxide in 2 parts water | 0.04 | were heated together under reflux at boiling temperature for 15 minutes, yielding a clear, viscous syrup having curing characteristics much the same as the product of Example 7. Under the same curing conditions, sulfamic acid as a curing reactant yielded a material that cured more rapidly to an insoluble, infusible state than that obtained by using chloroacetamide as a curing reactant.

The resinous materials of Examples 7 and 8 may be used in the preparation of various coating and impregnating compositions or they may be employed as a modifier of less plastic aminoplasts and other compatible synthetic resins to improve the plasticity thereof.

Example 9

| | Parts |
|---|---|
| Methyl alpha,beta-bis-(diamino s-triazinyl thio) propionate | 27.8 |
| Glycerine | 6.9 |
| Aqueous formaldehyde (approx. 37.1% HCHO) | 48.6 |
| Sodium hydroxide in 2 parts water | 0.04 | were heated together under reflux at the boiling temperature of the mass for 15 minutes. The resulting syrupy condensation product was dehydrated by heating it on a steam plate. The dehydrated syrup was readily soluble in ethylene glycol. When a small amount of chloroacetamide, sulfamic acid, citric acid or other curing agent such as mentioned under Example 1 was incorporated either into the syrupy condensation product as initially produced or into the dehydrated syrup, followed by heating on a 140° C. hot plate, the material cured to an insoluble, infusible state. Samples of the dehydrated syrup, both with and without a small amount of hydrochloric acid as a curing agent, were applied to glass plates and the coated plates were baked at 60° C. for several hours. In both cases hard, opaque films were formed on the plates. The unmodified syrup yielded a baked film that appeared to be somewhat harder than the film produced by the syrup to which the hydrochloric acid had been added. Solutions containing the resinous material of this example may be used as liquid coating and impregnating compositions.

Example 10

| | Parts |
|---|---|
| Methyl alpha,beta-bis-(diamino s-triazinyl thio) propionate | 27.8 |
| Polyvinyl alcohol | 3.4 |
| Aqueous formaldehyde (approx. 37.1% HCHO) | 48.6 |
| Sodium hydroxide in 2 parts water | 0.04 | were heated together under reflux at boiling temperature for 25 minutes, at the end of which period of time a white, gelatinous resin precipitated from the solution. Thermosetting compositions are produced by incorporating a small amount of chloroacetamide, citric acid, sulfamic acid, hydrochloric acid or other curing agent such as mentioned under Example 1 into the reaction product by adding such curing agent either before, during or after the reflux period. Samples of the gelatinous resin, both with and without a small amount of hydrochloric acid as a curing agent, were applied to glass plates and the coated plates were baked for several hours at 60° C. In both cases hard, transparent, baked films were formed on the plates. The resinous material of this example may be used in the preparation of coating and impregnating compositions or it may be employed in the production of molding compositions.

Example 11

A liquid, phenol-formaldehyde partial condensation product was prepared by heating together the following components for 4 hours at 65° C.:

| | Parts |
|---|---|
| Synthetic phenol | 90.0 |
| Aqueous formaldehyde (approx. 37.1% HCHO) | 195.0 |
| Potassium carbonate | 2.85 |

This liquid condensation product is identified in the following formula as "syrupy phenolic resin".

| | Parts |
|---|---|
| Syrupy phenolic resin | 83.4 |
| Methyl alpha,beta-bis-(diamino s-triazinyl thio) propionate | 2.78 |
| Sodium hydroxide | Trace | were heated together under reflux at the boiling temperature of the mass for 1 hour. The resulting resinous syrup cured under heat to an insoluble, infusible state in the presence of a small amount of citric acid, oxalic acid or other acidic material.

It will be understood, of course, by those skilled in the art that the reaction between the aldehyde and the triazine derivative may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of Examples 1 to 11, inclusive, under reflux at the boiling temperature of the mass as mentioned in the individual examples, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that our invention is not limited to condensation products obtained by reaction of ingredients comprising an aldehyde and the specific triazine derivative embraced by Formula I that is named in the above illustrative examples. Thus, instead of methyl alpha,beta-bis-(diamino s-triazinyl thio) propionate, we may use, for example, ethyl, propyl, butyl, amyl, phenyl, chlorophenyl, tolyl, etc., esters of alpha,beta-bis-(diamino s-triazinyl thio) propionic acid; methyl, ethyl, propyl, butyl, amyl, phenyl, chlorophenyl, tolyl, etc., esters of bis-(diamino s-triazinyl thio) acetic acid; methyl, ethyl, propyl, butyl, amyl, phenyl, chlorophenyl, tolyl, etc., esters of bis-[di-(methylamino) s-triazinyl thio] acetic or propionic acids; or any other triazine derivative of the kind embraced by Formula I, numerous examples of which have been given herein and in our copending application Serial No. 456,264.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives of urea, thiourea, selenourea and iminourea, and of substituted ureas, thioureas, selenoureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminodiazines, of the aminotriazoles, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexa-methylol melamines). Mixtures of aldehydes and aldehyde-addition products may be used, e. g., mixtures of formaldehyde and methylol compounds such, for instance, as dimethylol urea, trimethylol melamine, hexamethylol melamine, etc.

The ratio of the aldehydic reactant to the triazine derivative may be varied over a wide range depending upon the particular starting reactants employed and the particular properties desired in the finished product. Ordinarily these reactants are employed in an amount corresponding to at least one mol of the aldehyde, specifically formaldehyde, for each mol of the triazine derivative. Thus, we may use, for example, from 1 to 12 or 15 or more mols of an aldehyde for each mol of the triazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 25 or 30 or more mols of such alkylol derivatives for each mol of the triazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for example, methyl, ethyl, propyl, isopropyl, isobutyl, hexyl, etc., alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides, e. g., formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones, etc.; nitriles, including halogenated nitriles, e. g., succinonitrile, acrylonitrile, chloroacetonitriles, etc.; acylated ureas, more particularly halogenated acylated ureas of the kind described, for example, in D'Alelio Patent No. 2,281,559, issued May 5, 1942; and others.

The modifying bodies also may take the form of high molecular weight bodies with or without resinous characteristics, for example hydrolyzed wood products, formalized cellulose derivatives, lignin, protein-aldehyde condensation products, aminodiazine-aldehyde condensation products, aminotriazole-aldehyde condensation products, melamine-aldehyde condensation products, etc. Other examples of modifying bodies are the urea-aldehyde condensation products, the aniline-aldehyde condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc.; polyvinyl ethers, including polyvinyl acetals, specifically polyvinyl formal, etc.

Instead of effecting reaction between a triazine derivative of the kind embraced by Formula I and an aldehyde, specifically formaldehyde, we may cause an aldehyde to condense with a salt (organic or inorganic) of the triazine derivative or with a mixture of the triazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, oxalic, polyacrylic, methacrylic, polymethacrylic, malonic, succinic, adipic, maleic, fumaric, malic, benzoic, salicylic, phthalic, camphoric, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, plywood, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the product of reaction of ingredients comprising an aldehyde and a compound corresponding to the general formula

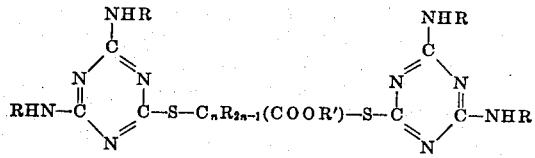

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

2. A composition of matter comprising the product of reaction of ingredients comprising formaldehyde and a compound corresponding to the general formula

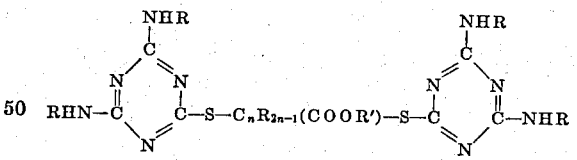

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

3. A composition of matter comprising the product of reaction of ingredients comprising an aldehyde and a compound corresponding to the general formula

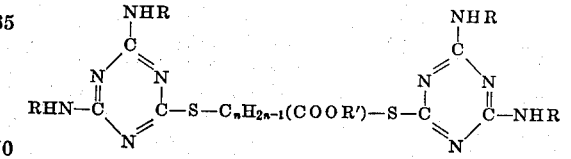

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

4. A composition of matter comprising the product of reaction of ingredients comprising an aldehyde and a compound corresponding to the general formula

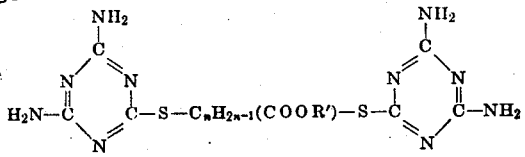

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

5. A composition as in claim 1 wherein the reaction product is the product obtained by effecting initial reaction between the specified components under alkaline conditions.

6. A composition as in claim 1 wherein the reaction product is an alcohol-modified reaction product of the stated components.

7. A heat-curable resinous composition comprising the heat-convertible condensation product of ingredients comprising formaldehyde and a compound corresponding to the general formula

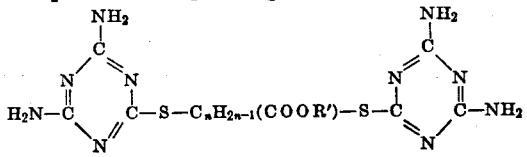

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

8. A product comprising the cured resinous composition of claim 7.

9. A composition comprising the resinous condensation product of ingredients comprising an aldehyde and an aliphatic ester of bis-(diamino s-triazinyl thio) acetic acid.

10. A composition comprising the resinous condensation product of ingredients comprising an aldehyde and an aromatic ester of bis-(diamino s-triazinyl thio) acetic acid.

11. A composition comprising the resinous condensation product of ingredients comprising an aldehyde and an aliphatic ester of bis-(diamino s-triazinyl thio) propionic acid.

12. A resinous composition comprising the condensation product of ingredients comprising an aldehyde and an alkyl ester of bis-(diamino s-triazinyl thio) propionic acid.

13. A composition comprising the resinous product of reaction of ingredients comprising formaldehyde and methyl alpha,beta-bis-(diamino s-triazinyl thio) propionate.

14. A composition comprising the product of reaction of ingredients comprising a urea, an aldehyde and a compound corresponding to the general formula

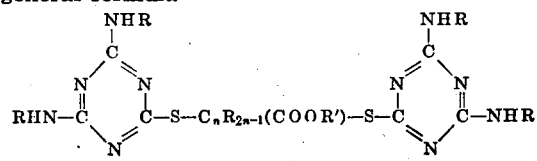

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

15. A composition comprising the resinous condensation product of ingredients comprising urea, formaldehyde and a compound corresponding to the general formula

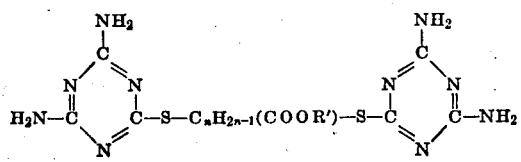

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

16. A composition comprising the resinous product of reaction of ingredients comprising urea, formaldehyde and methyl alpha,beta-bis-(diamino s-triazinyl thio) propionate.

17. A resinous composition comprising the product of reaction of ingredients comprising dimethylol urea and an aliphatic ester of bis-(diamino s-triazinyl thio) propionic acid.

18. A composition comprising the product of reaction of ingredients comprising melamine, an aldehyde and a compound corresponding to the general formula

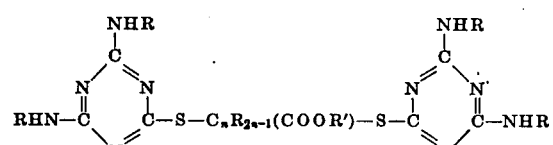

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

19. A heat-curable composition comprising the heat-convertible resinous reaction product of (1) a partial condensation product of ingredients comprising formaldehyde and a compound corresponding to the general formula

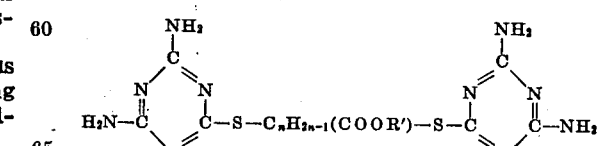

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals, and (2) a curing reactant.

20. The method of preparing new synthetic compositions which comprises effecting reaction between ingredients comprising an aldehyde and a compound corresponding to the general formula

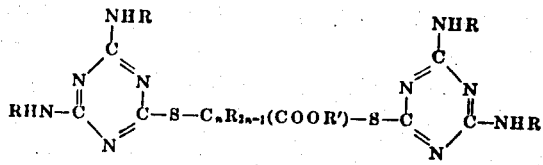

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

GAETANO F. D'ALELIO.
JAMES W. UNDERWOOD.